Sept. 13, 1960 F. E. BACHMAN 2,952,224
BOLSTER SUSPENSION
Filed March 29, 1956 3 Sheets-Sheet 3
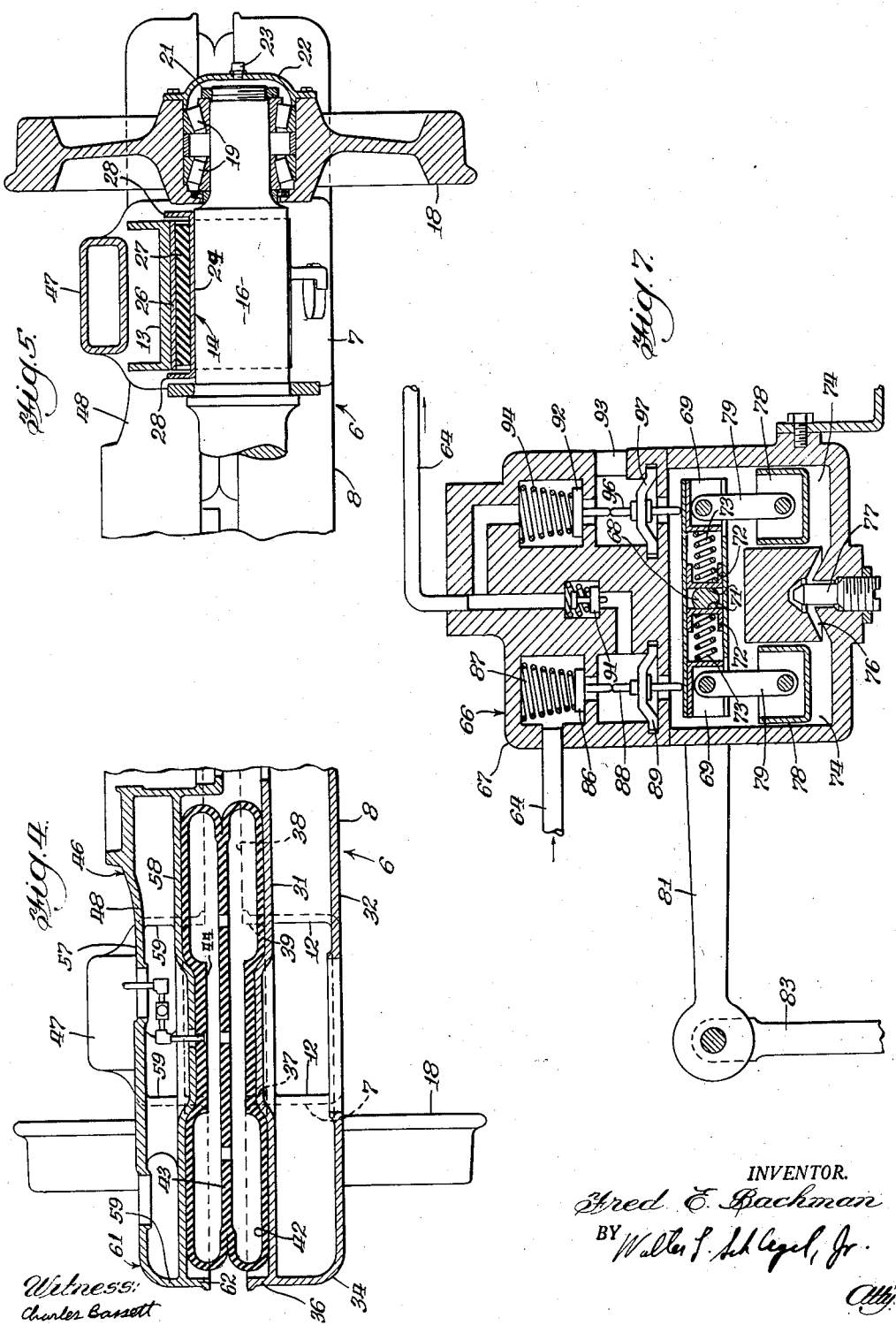
INVENTOR.
Fred E. Bachman
BY Walter J. Schlegel, Jr.
Atty.
Witness:
Charles Bassett

United States Patent Office

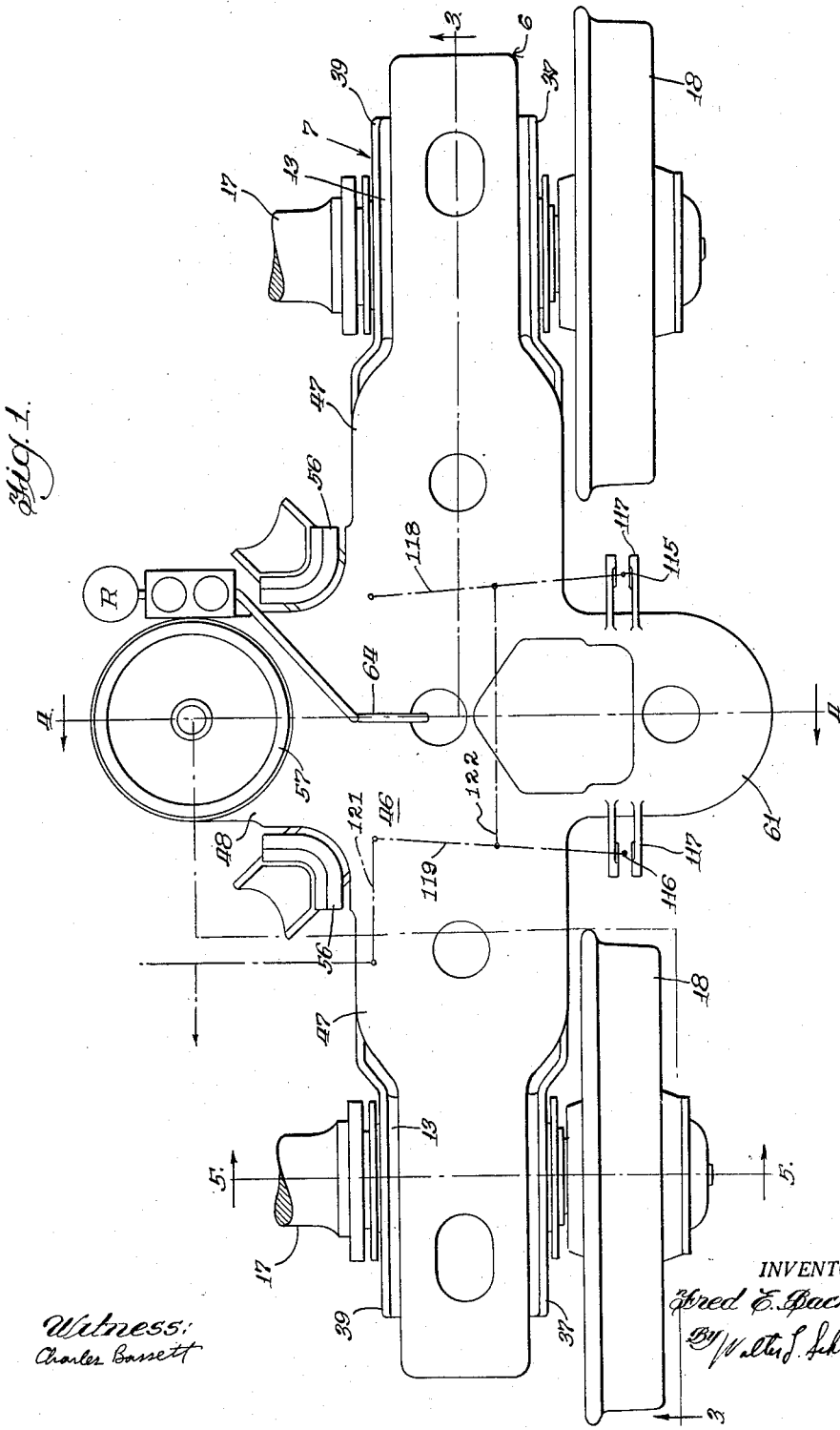

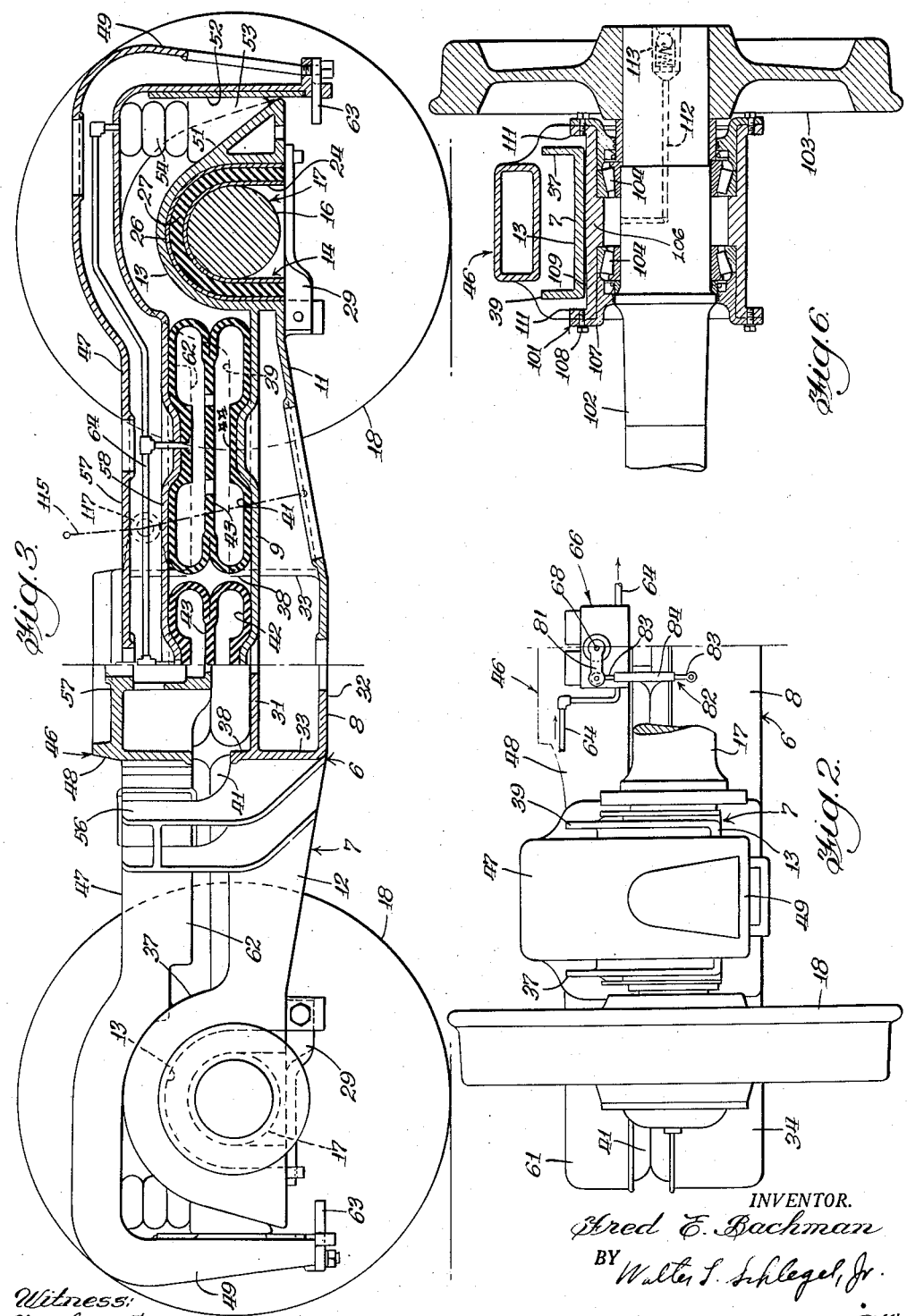

2,952,224
Patented Sept. 13, 1960

2,952,224
BOLSTER SUSPENSION

Fred E. Bachman, Granite City, Ill., assignor to American Steel Foundries, Chicago, Ill., a corporation of New Jersey Filed Mar. 29, 1956, Ser. No. 574,777

4 Claims. (Cl. 105—197)

This invention relates to bolster suspensions for railway car trucks and more particularly to a pneumatic suspension arrangement in which a bolster is resiliently supported on a truck frame.

An object of the present invention resides in the provision of a pneumatic suspension arrangement in which a plurality of inflatable hollow pads are interposed between a generally H-shaped bolster and a generally H-shaped truck frame, the bolster and truck frame being formed and arranged to seat relatively large area pads therebetween in order to support maximum loads when inflated under relatively low pressures.

Another object of the invention resides in the provision of a pneumtic bolster suspension for railway car trucks in which the air pressure within the inflatable hollow pads is automatically regulated to support different weights.

A further object of the invention resides in the provision of independent pneumatic suspensions provided to resiliently support opposite sides of the bolster to prevent lateral tilting of the bolster due to non-uniform loading of a car body.

Another object of the invention is to provide a pneumatic bolster suspension for a truck in which the side rails of a one-piece truck frame are supported at their ends on wheel and axle assemblies inboard from the wheels to thereby provide a truck of relatively inexpensive, light-weight construction.

Another object of the invention resides in the provision of a pneumatic bolster suspension for railway car trucks in which friction snubbing means are provided at the ends of the truck frame side rails to frictionally engage the bolster against movement relative to the truck frame.

Another object of the invention is to provide a pneumatic bolster suspension in which the force exerted by the snubbing means in frictionally resisting movement of the bolster relative to the truck frame is automatically regulated responsive to different weights applied to the bolster.

Another object of the invention resides in the provision of a pneumatic bolster suspension in which brake levers are pivotally mounted on the bolster to support brake shoes for engagement with their respective wheels.

The invention embodies other novel features, details of construction and arrangement of parts which are hereinafter set forth in the specification and claims and illustrated in the accompanying drawings, wherein:

Figure 1 is a top plan view showing a railway car truck provided with a pneumatic bolster suspension embodying features of the invention, only one half of the truck being shown as it is symmetrical on opposite sides of its longitudinal center line;

Figure 2 is an end elevational view of same;

Figure 3 is a side elevational view of same, partly in section along the line 3—3 of Figure 1;

Figure 4 is a transverse sectional view taken along the line 4—4 of Figure 1;

Figure 5 is a transverse sectional view taken along the line 5—5 of Figure 1;

Figure 6 is a transverse sectional view, corresponding to Figure 5, illustrating a modified form of the invention in which the axles are journaled in anti-friction bearings provided on the truck frame, and Figure 7 is a schematic longitudinal sectional view illustrating an air regulator mechanism adapted for use in controlling the flow of air into or out of the inflatable pads responsive to variations in loads supported thereon.

Referring now to the drawings for a better understanding of the invention and more particularly to Figures 1 to 5 therein, a railway truck is shown as comprising a one-piece truck frame 6 having side rails 7—7 interconnected intermediate their ends by a transom 8. The side rails are preferably of box section comprising top and bottom walls 9 and 11 and side walls 12, said walls converging toward and merging at their ends with inverted U-shaped bearing housings 13 provided with suitable bearings 14 to engage journal portions 16 of axles 17 inboard from wheels 18 provided thereon.

In this form of the invention, the wheels 18 are shown as journaled on anti-friction bearings 19 secured on the ends of the axles by means of nuts 21. Hub caps 22 are secured on the wheels by means of screws and provided with suitable fittings 23 through which lubricant may be provided for the anti-friction bearings. The bearings 14 are shown as comprising inner and outer U-shaped casings 24 and 26 bonded to opposite sides of a resilient rubber pad 27, the inner casings having radially disposed end flanges 28. The axles 17 and bearings 14 are secured against displacement from their respective bearing housings 13 by means of retainer keys 29 detachably mounted on and extending across the bottom of each housing.

The transom 8 is of box section having a top wall 31, bottom wall 32 and side walls 33 merging with the top, bottom and side walls 9, 11 and 12, respectively, of the side rails 7 and extending outboardly of the latter to form outboard pad supports 34. The pad supports 34 are provided with upwardly projecting marginal flanges 36 which merge with upwardly projecting flanges 37 extending along the outboard sides of the side rails 7 and bearing housings 13. The transom 8 is provided with upwardly projecting marginal flanges 38 which merge with upwardly projecting flanges 39 extending along the inboard sides of the side rails 7 and bearing housings 13.

Two hollow inflatable pads 41 are mounted on each side rail 7, and two relatively larger inflatable pads 42 are mounted on opposite ends of the transom 8 and extend outboardly between the pads 41 onto their respective outboard pad supports 34. Each pad is preferably formed of resilient and/or flexible material, such as rubber, to provide upper and lower air chambers separated by an apertured intermediate wall 43 engageable between thick resilient bosses 44—44 when the pad is deflated.

The pads 41 and 42 serve to resiliently support a bolster 46 having a contour, as viewed in top plan, substantially conforming to the contour of the truck frame 6. The bolster is shown as comprising elongated side sections 47—47 overlying their respective side rails 7—7, the side sections being interconnected by a transverse section 48 overlying the transom 8. As illustrated in Figure 3, the ends of the side sections 47 extend outwardly and downwardly at 49 over the ends of the side rails 7.

The ends of the side rails are formed with wedge surfaces 51 sloping downwardly and outwardly toward vertical friction surfaces 52 provided on the inner sides of the ends 49 of the bolster side sections. A wedge-shape snubber 53 is urged downwardly between each wedge surface 51 and its respective friction surface 52 by suitable resilient means such as inflatable compressible hollow cushions 54 interposed between the snubbers 53 and the side sections of the bolster. The snubbers are thus positioned in flat face engagement with their respective surfaces 51 and 52 to yieldably and frictionally resist movement of the bolster relative to the truck frame. To positively limit longitudinal, transverse or angular movement of the bolster relative to the truck frame, the frame is provided with four stop or guide arms 56 projecting upwardly therefrom along the sides of the bolster at the junctures of the side and transverse sections thereof. The bolster is provided with a central bearing portion 48 for pivotal connection in a conventional manner with a car body (not shown).

To provide maximum strength with minimum weight, the side and transverse sections of the bolster are of box cross section comprising top and bottom walls 57 and 58 interconnected by side walls 59, said walls extending outwardly from opposite sides of the bolster to form outboard pad engaging ledges 61 overlying the pad supports 34. The bolster 46 is provided with downwardly projecting marginal flanges 62 disposed along the sides of the pads. Abutment members 63 are detachably mounted on the lower ends of the end portions 49 of the bolster to limit vertical parting movement of the bolster and truck frame.

Two identical independent pneumatic suspension systems are provided for opposite sides of the truck, each system comprising hollow inflatable pads 41 and 42 and cushions 54 connected by a conduit 64 to a suitable source of air under pressure. An air regulator 66 is mounted on the bolster to automatically control the flow of air into and out of the pads and cushions responsive to variations in load forces applied to the bolster during loading or unloading of a car body supported thereon.

As schematically illustrated in Figure 7 in the drawing, the air regulator 66 is shown as comprising a housing 67 having a shaft 68 journaled thereon to support a follower 69 intermediate its ends, the follower extending transversely of the shaft and being rotatable relative thereto. The shaft 68 is formed with diametrically opposed flat surfaces 71—71 normally engaged by their respective flat face plungers 72—72 which are urged toward each other by compression springs 73—73.

The housing 67 is formed with cylinders 74—74 containing liquid and interconnected by a passageway 76 having a needle valve 77 therein. Pistons 78 are provided in the cylinders and connected to opposite ends of the follower 69 by links 79 to serve as dash pots to retard pivotal movement of the follower responsive to rotational movement of the shaft 68. A shaft actuating arm 81 is keyed to one end of the shaft 68 and is pivotally connected to one end of a connecting link 82 which is pivotally connected at its other end to the truck frame 6. The connecting link 82 is preferably in the form of a turnbuckle comprising eye members 83 reversely threaded into opposite ends of a sleeve 84 to facilitate adjustment of the arm 81 relative to the truck frame.

An air inlet valve 86 is provided within the housing 67 to control the flow of pressure fluid through the conduit 64 to the pads 41 and 42 and cushions 54, the valve being normally held in its closed position by a compression spring 87. A push rod 88 is mounted for reciprocative movement in a bearing seal member 89 to open the inlet valve 86 responsive to clockwise movement of the follower 69. A check valve 91 is provided to prevent a reverse flow of pressure fluid from the inflatable members through the inlet valve.

An exhaust valve 92 is provided within the housing 67 to control the flow of pressure fluid from the pads 41 and 42 and cushions 54 through the conduit 64 and exhaust port 93 to the atmosphere, the valve being normally held in closed position by a compression spring 94. A push rod 96 is mounted for reciprocative movement in a bearing seal member 97 to open the exhaust valve responsive to counterclockwise movement of the follower 69.

In operation, the air regulator mechanism 66 thus shown and described acts automatically to supply air to or exhaust air from the pads 41 and 42 and cushions 54 to support loads of different weights on the bolster. When a heavy load is placed on the bolster to cause it to move downwardly toward the truck frame, the follower 69 is caused to move in a clockwise direction to open the inlet valve 86 to supply pressure fluid to the inflatable members until the bolster rises to a predetermined position above the truck frame. When a heavy load is removed from the bolster to cause it to move upwardly from the truck frame, the follower 69 moves in a counterclockwise direction to thereby open the exhaust valve 92 to exhaust air from the inflatable members until the bolter is lowered to a predetermined position with respect to the truck frame.

During travel of the truck over rough track, the bolster moves vertically relative to the truck frame without opening the inlet or exhaust valves 86 and 92. During such rapid movements of the bolster, rotation of the shaft merely acts to move the plungers 72 away from each other, without imparting corresponding rotational movement of the follower 69, which is restrained against rapid movement by the pistons 78.

It will thus be noted that the air pressure within the pads 41 and 42 and cushions 54 is increased or decreased responsive to vertical movement of the bolster relative to the truck frame in order to maintain a predetermined spacing therebetween when the car body is in either loaded or unloaded condition.

Figure 6 in the drawings illustrates a modified form of the invention in which anti-friction bearing assemblies 101 are mounted within the bearing housings 13 provided at the ends of the side rails 7 of the truck frame 6 to rotatably support axles 102 having wheels 103 fixed on the ends thereof. The bearing assembly 101 is shown as comprising axially spaced sets of roller bearings 104 secured with a casing 106 by means of retainer rings 107 secured thereon by screws 108, the upper surface of the casing being rounded at 109 for rocking engagement with the housing 13. The casing 106 is provided with side flanges 111 spaced from the sides of the housing 13 to permit limited axial movement of the wheel and axle assembly. Lubricant is supplied to the bearings 104 through passageway 112 having a check valve 113 therein.

A brake arrangement particularly suited for use on the truck structure is schematically illustrated in Figures 1 and 3 in the drawings. The brake arrangement is shown as comprising brake levers 115 and 116 pivotally mounted intermediate their ends on lugs 117 provided on opposite sides of each bolster ledge 61, each lever carrying a conventional brake head-shoe assembly (not shown) on its lower end to frictionally engage the tread surface of its respective wheel 18.

The upper end of the brake lever 115 is pivotally connected to the outboard end of a horizontal dead actuating lever 118 which is pivotally connected at its inboard end to the bolster. The upper end of the brake lever 116 is pivotally connected to the outboard end of a horizontal live actuating lever 119 having its inboard end connected to power actuated pull rods 121. The dead and live actuating levers are interconnected intermediate their ends by a connecting link 122. Movement of the pull rods 121 longitudinally of the truck will cause movement of the brake levers toward their respective tread surfaces to frictionally engage brake shoes therewith.

I claim:
1. In a railway truck, axles having wheels at the ends thereof, a truck frame having side rails supported at their ends on said axles inboardly from said wheels, said truck frame having a centrally disposed transom interconnecting said side rails, a bolster having side and end sections overlying said side rails and axles and having a tranverse section overlying said transom, air-filled hollow pads interposed between said side rails and said side sections and between said transverse section and transom, said pads resiliently supporting said bolster on said truck frame, and means operable to vary the quantity of air in said pads responsive to different load forces on said bolster whereby a predetermined spacing is maintained between the bolster and truck frame irrespective of load on the bolster.

2. In a railway truck, axles having wheels at the ends thereof, a truck frame having box-shaped side rails supported at their ends on said axles inboardly from said wheels, a box-shaped transverse member disposed between said wheels and interconnecting said side rails, a bolster having box-shaped side sections overlying said side rails and axles, a box-shaped transverse member overlying said transverse member and interconnecting said side sections, air-filled hollow pads interposed between said side rails and said side sections, other air-filled hollow pads interposed between said members, said pads and said other pads resiliently supporting said bolster at a predetermined distance above said truck frame, and means operable to vary the amount of air in all of said pads responsive to an increase or decrease of load forces on said bolster whereby said predetermined spacing is maintained between the bolster and truck frame, said means comprising a regulator mounted on the bolster provided with independently operated air inlet and outlet valves controlling the flow of the amount of air into and out of said pads, and means to selectively open said valves responsive to vertical movement of said bolster relative to said truck frame.

3. In a railway car truck, a plurality of wheel and axle assemblies, an H-shaped frame member supported substantially inboardly of the wheels of said assemblies, said frame member being fixed relative to said assembly, said member having end portions disposed on the axles of said assemblies, pneumatic spring means disposed on said member between said axles, an H-shaped bolster member suported by said spring means, said bolster member being disposed substantially inboardly of said wheels, said bolster member having end sections disposed outwardly of said end portions, said end sections extending downwardly from said bolster member to confine said end portions, pneumatic snubbing means interposed between and engaging said end sections and said end portions to frictionally resist the movement of the bolster member relative to the frame member, and actuating means operably connected to said pneumatic spring means and snubbing means to increase or decrease the quantity of air therein responsive to increasing or decreasing weights, respectively, applied to the bolster member.

4. A vehicle comprising spaced wheel and axle assemblies, a supporting member carried thereon substantially inboardly of the wheels of said assemblies and fixed relative thereto, said member comprising side rails interconnected by a transom, pneumatic fluid-filled hollow pads disposed on said supporting member, certain of said pads being disposed entirely on said side rails and extending longitudinally thereof, other of said pads extending longitudinally of said transom and being disposed on said side rails and said transom, said other pads extending inboardly and outboardly of said side rails, said side rails having end portions carried by the axles of said assemblies, a supported member disposed on all of said pads, said supported member having side sections interconnected by a bolster, said side sections having end sections extending outwardly of said end portions and confining respective end portions, pneumatic snubbing means disposed between related end sections and end portions to frictionally resist vertical movement of the supported member relative to the supporting member, and pneumatic actuating means automatically operable to increase or decrease the quantity of air in all of said pads and said snubbing means in response to an increase or decrease in weight, respectively, on the supported member.

References Cited in the file of this patent
UNITED STATES PATENTS

| | | |
|---|---|---|
| 916,556 | Howard | Mar. 30, 1909 |
| 1,008,290 | Verge | Nov. 7, 1911 |
| 1,555,199 | Gouirand | Sept. 29, 1925 |
| 1,712,749 | Clasen | May 14, 1929 |
| 2,180,492 | Wilson | Nov. 21, 1939 |
| 2,181,908 | Mussey | Dec. 5, 1939 |
| 2,229,429 | Travilla | Jan. 21, 1941 |
| 2,234,414 | Orr | Mar. 11, 1941 |
| 2,288,383 | Anderson | June 30, 1942 |
| 2,334,024 | Nystrom et al. | Nov. 9, 1943 |
| 2,355,450 | Leese | Aug. 8, 1944 |
| 2,374,218 | Ledwinka | Apr. 24, 1945 |
| 2,399,519 | Tack | Apr. 30, 1946 |
| 2,545,591 | Shaw | Mar. 20, 1951 |
| 2,579,084 | Krotz et al. | Dec. 18, 1951 |
| 2,633,811 | Poage | Apr. 7, 1953 |
| 2,670,201 | Rossman | Feb. 23, 1954 |
| 2,691,420 | Fox et al. | Oct. 12, 1954 |
| 2,704,039 | Withall | Mar. 15, 1955 |
| 2,721,523 | McIntosh | Oct. 25, 1955 |
| 2,729,173 | Couch | Jan. 3, 1956 |
| 2,731,923 | Couch | Jan. 24, 1956 |
| 2,753,814 | Dilworth | July 10, 1956 |
| 2,758,549 | Lich | Aug. 14, 1956 |
| 2,782,049 | Peras | Feb. 19, 1957 |
| 2,787,475 | Jackson | Apr. 2, 1957 |